United States Patent
Roychoudhury

(10) Patent No.: US 9,248,798 B2
(45) Date of Patent: Feb. 2, 2016

(54) PASSIVE KNEE BOLSTER

(71) Applicant: Salflex Polymers Limited, Weston (CA)

(72) Inventor: Raj Roychoudhury, Bloomfield Hills, MI (US)

(73) Assignee: Salfex Polymers Limited, Weston, ON (CA)

( * ) Notice: Subject to any disclaimer, the term of this patent is extended or adjusted under 35 U.S.C. 154(b) by 0 days.

(21) Appl. No.: 14/401,124

(22) PCT Filed: May 14, 2013

(86) PCT No.: PCT/US2013/040837
§ 371 (c)(1),
(2) Date: Nov. 14, 2014

(87) PCT Pub. No.: WO2013/173262
PCT Pub. Date: Nov. 21, 2013

(65) Prior Publication Data
US 2015/0102590 A1    Apr. 16, 2015

Related U.S. Application Data

(60) Provisional application No. 61/646,919, filed on May 15, 2012.

(51) Int. Cl.
*B60R 21/045* (2006.01)
*B60R 21/04* (2006.01)
*B60R 21/00* (2006.01)

(52) U.S. Cl.
CPC ....... *B60R 21/045* (2013.01); *B60R 2021/0051* (2013.01); *B60R 2021/0414* (2013.01)

(58) Field of Classification Search
CPC ...... B60R 21/045; B60R 21/04; B60R 21/02; B60R 2021/0051; B60R 2021/0414
See application file for complete search history.

(56) References Cited

U.S. PATENT DOCUMENTS

| 4,709,943 A | 12/1987 | Yoshimura et al. |
| 5,507,540 A * | 4/1996 | Pernot ............. B60R 19/18 267/140 |

(Continued)

FOREIGN PATENT DOCUMENTS

| EP | 1 687 185 | 6/2015 |
| GB | 2335171 | 9/1999 |

OTHER PUBLICATIONS

Extended European Search Report, EP Application No. 13 79 0410.8, Nov. 3, 2015.

*Primary Examiner* — Keith Frisby
(74) *Attorney, Agent, or Firm* — Medler Ferro PLLC

(57) ABSTRACT

A bolster assembly for a vehicle is provided, the bolster assembly comprising a body, and a plurality of brackets provided on a front surface of the body, the plurality of brackets being arranged in paired sets. Also provided is a plurality of energy absorbing elements, wherein each of the plurality of energy absorbing elements is operably associated with a respective bracket, and where within each paired set of brackets, the energy absorbing elements are disposed in adjacent relationship separated by a gap. Each paired set of brackets is aligned with a frame structure provided in the vehicle, the frame structure having a width greater than the gap. Upon a crash event and forward displacement of the body, the paired sets of brackets engage the frame structure, the energy absorbing elements deforming during the forward displacement to absorb energy.

11 Claims, 10 Drawing Sheets

(56) References Cited

U.S. PATENT DOCUMENTS

| | | |
|---|---|---|
| 6,270,131 B1 | 8/2001 | Martinez et al. |
| 6,520,568 B2 * | 2/2003 | von Holst ............ B60R 13/0225 280/748 |
| 7,651,157 B2 * | 1/2010 | Jonsson .................... B60R 7/06 280/752 |
| 8,215,699 B2 * | 7/2012 | Suzuki ................... B60J 5/0451 296/146.6 |
| 8,348,313 B2 * | 1/2013 | Chickmenahalli ...... B60R 19/18 293/120 |
| 2001/0052210 A1 | 12/2001 | Mizutani et al. |
| 2005/0218641 A1 * | 10/2005 | Tajima .................. B60R 21/045 280/752 |
| 2006/0038389 A1 * | 2/2006 | Ko ........................ B60R 21/045 280/752 |
| 2007/0222197 A1 * | 9/2007 | Makita .................. B60R 21/045 280/752 |
| 2008/0150268 A1 | 6/2008 | Best et al. |
| 2009/0020992 A1 | 1/2009 | Jager et al. |
| 2009/0020993 A1 * | 1/2009 | Cappabianca ........ B60R 21/045 280/752 |
| 2009/0045613 A1 | 2/2009 | Baldwin |
| 2012/0126563 A1 * | 5/2012 | Kuwano ................... B60R 7/06 296/37.12 |

* cited by examiner

Section A-A

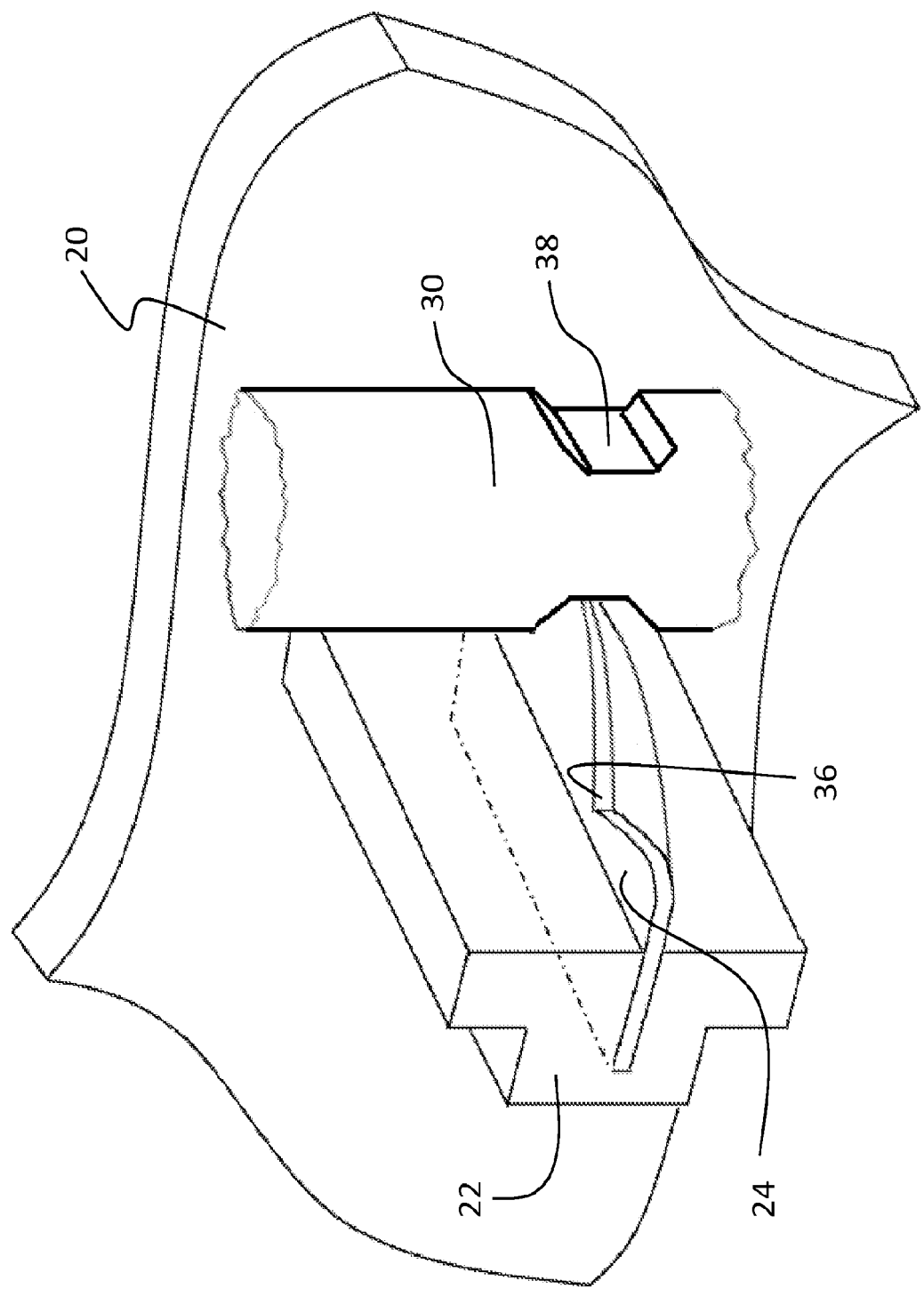

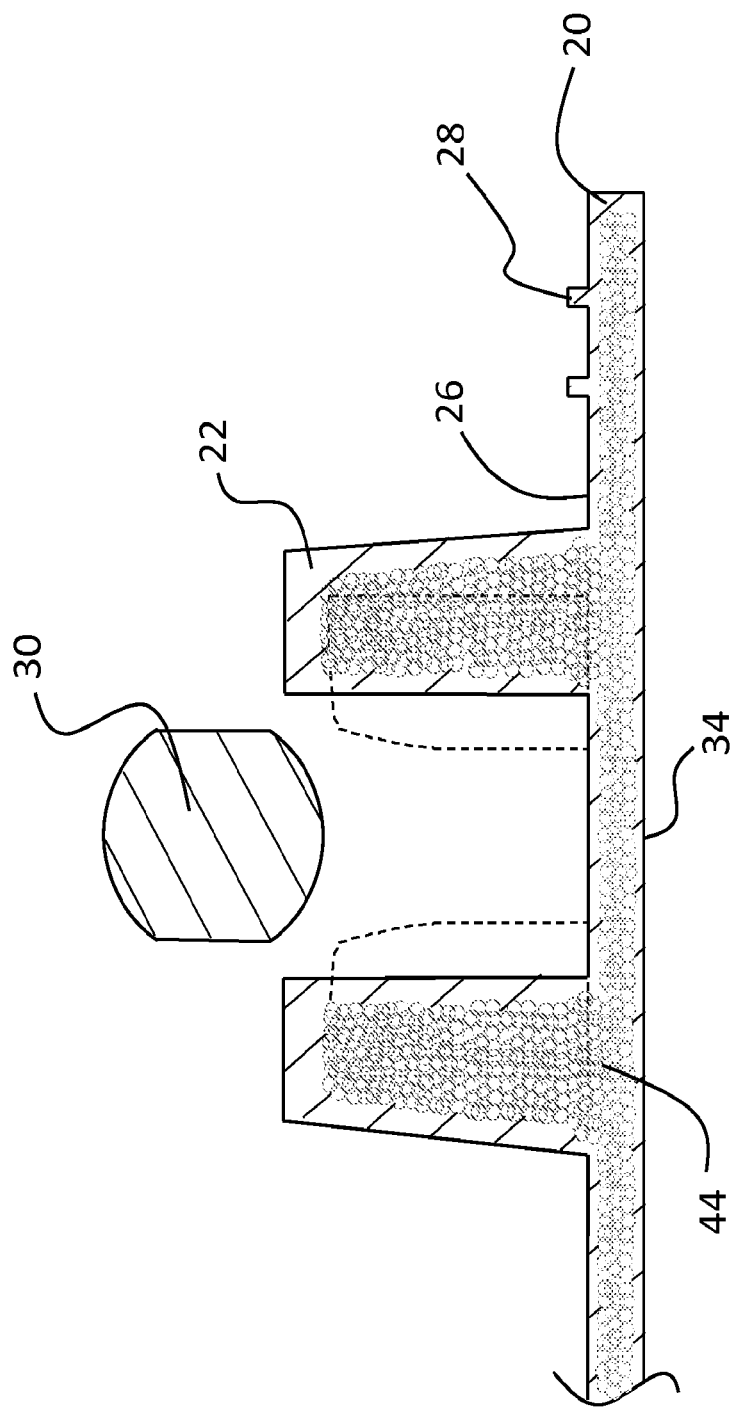

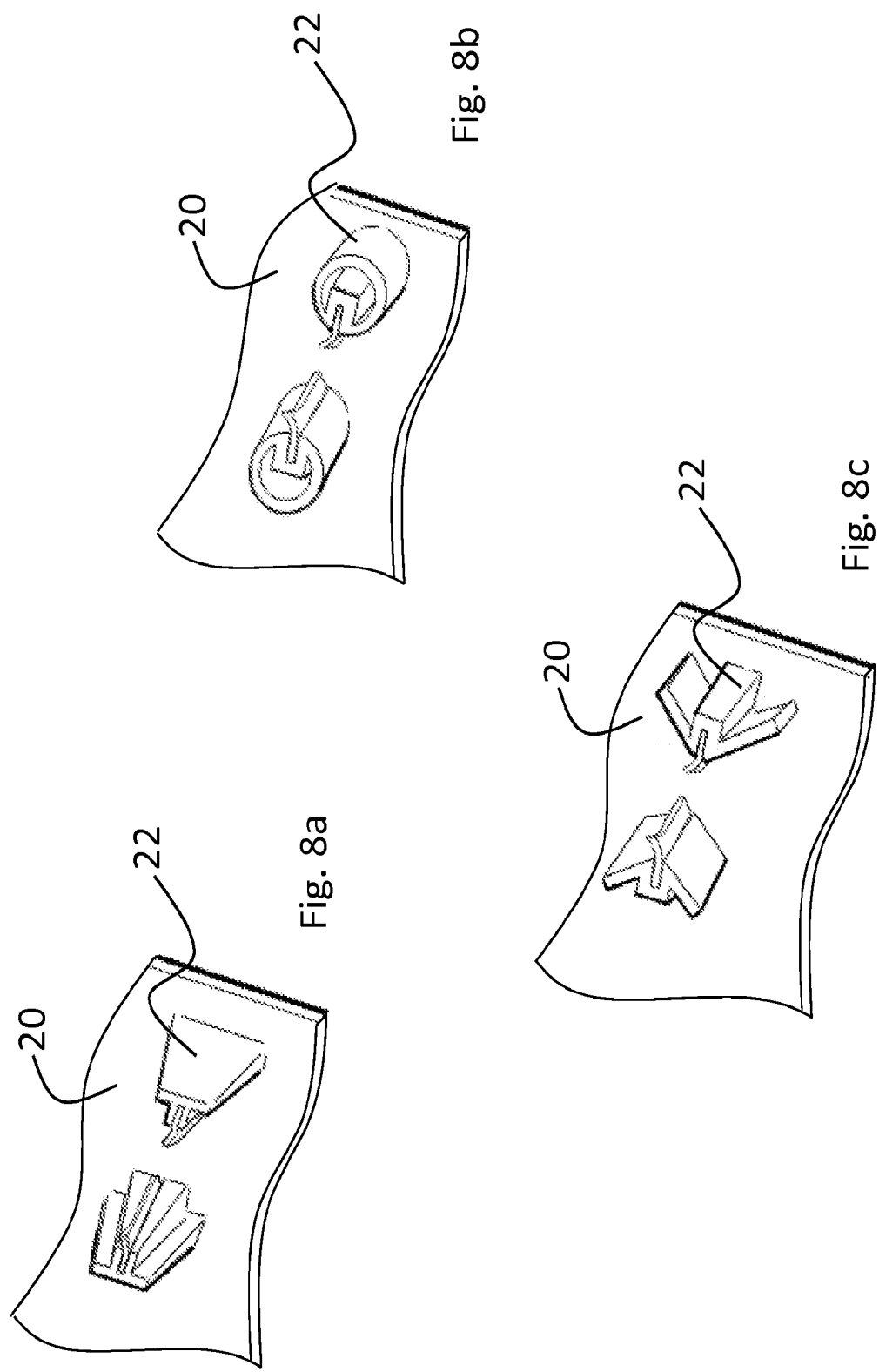

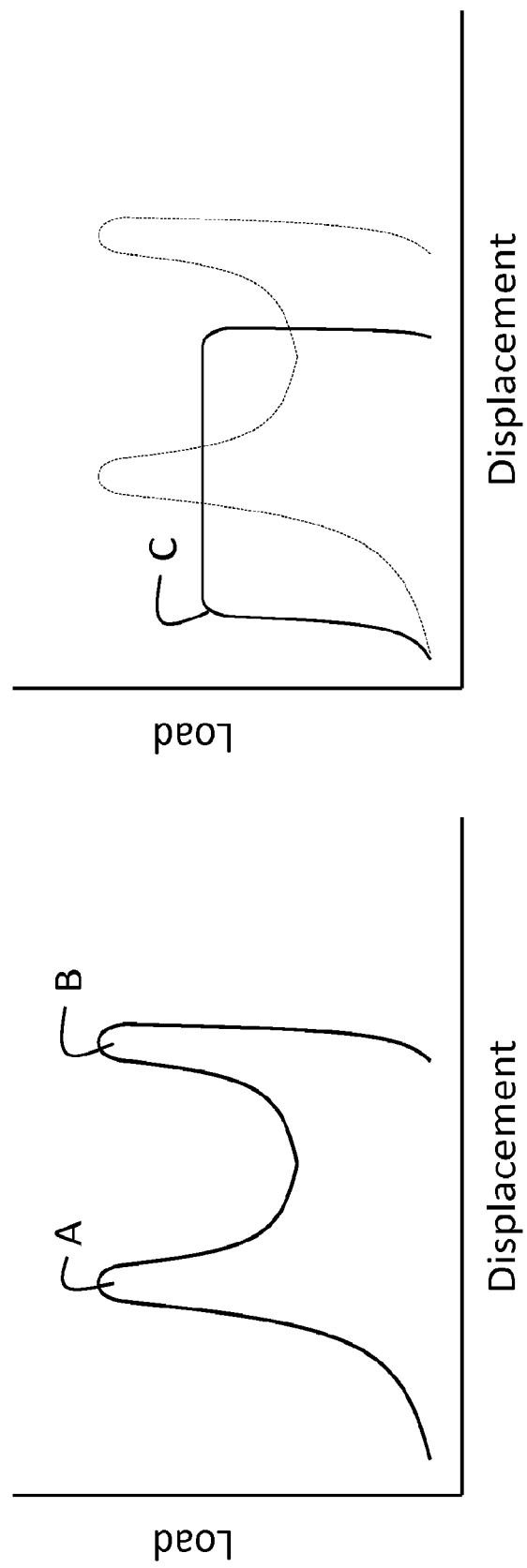

PASSIVE KNEE BOLSTER

CROSS-REFERENCE TO RELATED APPLICATION

This application claims benefit under 35 U.S.C. §119(e) to U.S. Provisional Patent Application No. 61/646,919 filed May 15, 2012, which is incorporated by reference herein in its entirety.

FIELD OF THE INVENTION

The present invention relates to a vehicle protective device, and more particularly to a passive knee bolster having an integrated energy absorption feature.

BACKGROUND OF THE INVENTION

In the manufacture of automotive vehicles such as passenger cars and trucks, there are many safety standards that must be met by the vehicle to reduce the likelihood and/or severity of injury to occupants during a crash event.

In order to meet these safety standards, portions of the vehicle, for example interior structures such as the instrument panel assembly are required to absorb at least some of the energy of an impact of an occupant during a crash event. To achieve this, the instrument panel assembly may implement one or more energy absorbing structures known as a bolster. For example, a knee bolster assembly may be implemented to absorb energy in the event of an impact from the knees of a vehicle occupant during a crash event. In general, energy absorption is achieved through deformation of the bolster structure.

Passive bolster assemblies may additionally use specialized structures to assist with energy dissipation. For example, some passive bolster assemblies incorporate energy absorbing brackets. In some forms, these brackets dissipate the energy by way of controlled deformation of the bracket structure during the crash event.

In many current designs, the bolster forms a portion of the surface of the instrument panel, and therefore must meet certain appearance characteristics. Many bolster systems are made from injection-molded parts, which have good appearance characteristics on the surface which is visible within the vehicle. However, in order to achieve these appearance characteristics, injection molded parts must be formed within certain design parameters. For example, to avoid warping and shrinkage issues, injection molded parts are often provided with wall structures of 3 mm or less, thus limiting the overall strength of the bolster system. To compensate, the injection-molded bolster component is mated to a metal back-plate for overall strengthening. These components are ultimately connected to the vehicle structure using separately formed brackets, designed to provide the energy absorbing characteristics of the overall bolster system.

Bolster systems constructed in this way, that is having an injection molded component, a metal back-plate, and bracket structures are complicated and expensive structures to manufacture. In addition, conventional passive bolster systems have been known to produce load-deflection profiles that are not optimal for injury mitigation. For example, conventional passive bolster systems generally exhibit a non-uniform deformation resistance, as well as excessively long displacement to dissipate a given quantity of energy. As a result, typical load-deflection profiles for conventional bolster systems show one or more peak loads that are high with respect to recommended limits. Accordingly, there exists a need for a more simplified overall construction capable of achieving a load deflection profile that effectively dissipates energy in a controlled manner, with shorter overall displacement, and within recommended injury threshold limits.

SUMMARY OF THE INVENTION

According to an aspect of an embodiment, provided is a bolster assembly for a vehicle, the bolster assembly comprising a body, and a plurality of brackets provided on a front surface of the body, the plurality of brackets being arranged in paired sets. Also provided is a plurality of energy absorbing elements, wherein each of the plurality of energy absorbing elements is operably associated with a respective bracket, and where within each paired set of brackets, the energy absorbing elements are disposed in adjacent relationship separated by a gap. Each paired set of brackets is aligned with a frame structure provided in the vehicle, the frame structure having a width greater than the gap. Upon a crash event and forward displacement of the body, the paired sets of brackets engage the frame structure, the energy absorbing elements deforming during the forward displacement to absorb energy.

According to another aspect of an embodiment, provided is a bolster system for a vehicle, the bolster system comprising a frame structure provided on the vehicle, and a bolster assembly for mounting to the vehicle. The frame structure presents a cross-bar beam and one or more extension beams extending therefrom. The bolster assembly comprises a body, and a plurality of brackets provided on a front surface of the body, the plurality of brackets being arranged in paired sets. Also provided is a plurality of energy absorbing elements, wherein each of the plurality of energy absorbing elements is operably associated with a respective bracket, and where within each paired set of brackets, the energy absorbing elements are disposed in adjacent relationship separated by a gap. Each paired set of brackets is aligned with a respective extension beam of the frame structure, the extension beam having a width greater than the gap. Upon a crash event and forward displacement of the body, the paired sets of brackets engage the extension beam, the energy absorbing elements deforming during the forward displacement to absorb energy.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 6b is an enlarged perspective view similar to FIG. 6a, showing partial engagement with an extension beam.

FIG. 7 is an enlargement of one pair of brackets similar to FIG. 4, where the structure comprises a foamed core.

FIGS. 8a to 8c are partial perspective views showing alternate configurations of energy absorbing brackets.

FIG. 10 is a load deflection profile for an exemplary conventional prior art passive bolster.

FIG. 11 is a load deflection profile for a passive bolster constructed in accordance with the present invention.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the passive bolster in the form of a knee bolster, the invention may also be used in other bolster applications, for example passive side bolsters, and certain active bolster applications. Furthermore, there is no intention to be bound by any expressed or implied theory presented in the preceding technical field, background, brief summary or the following detailed description.

In the bolster application described herein, the term "front" is descriptive of features generally facing towards the front of the vehicle, while the term "rear" is descriptive of features generally facing towards the rear of the vehicle.

Figure 1:
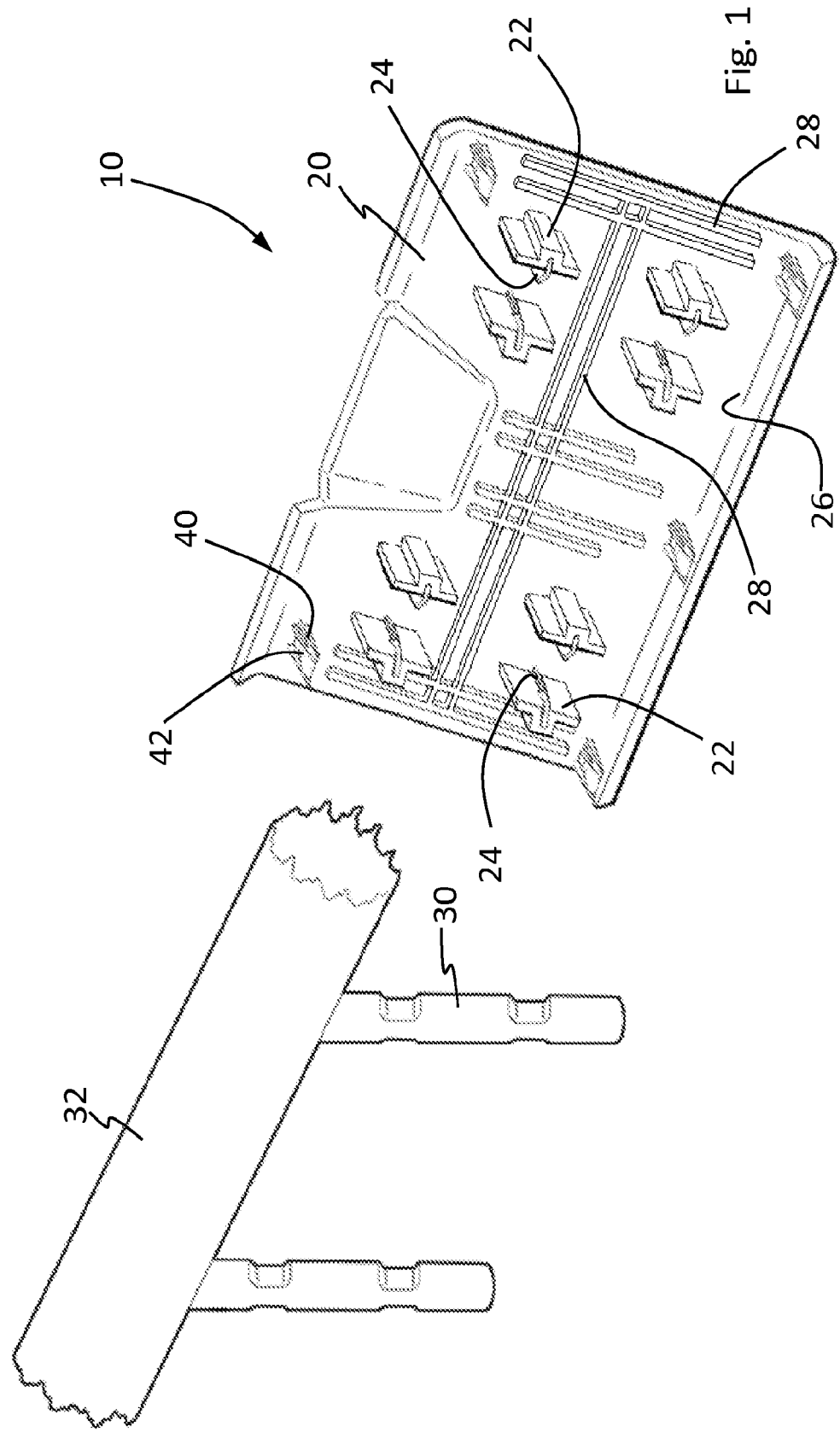
FIG. 1 is a perspective view of a passive knee bolster assembly according to an embodiment of the invention.
Figure 2:
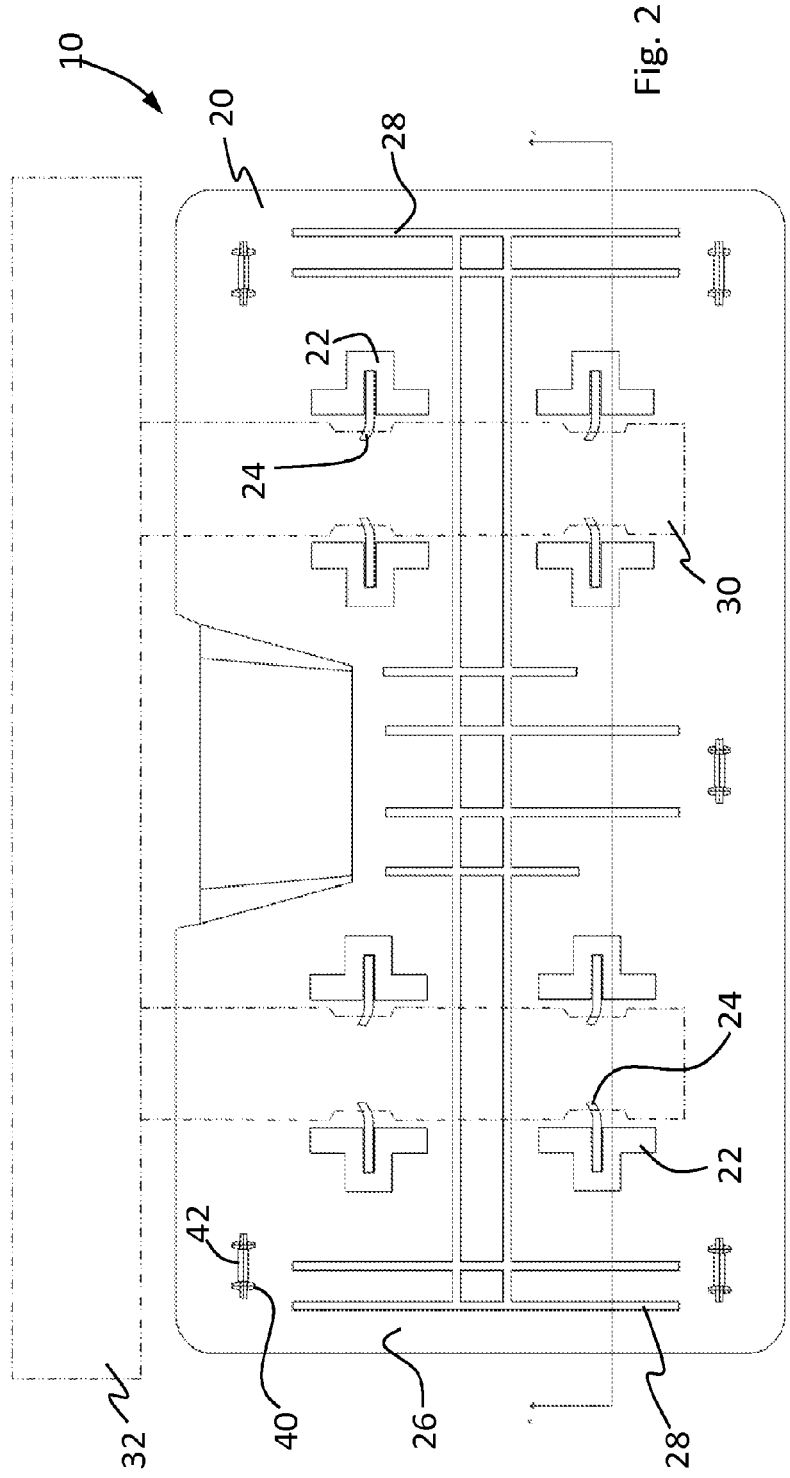
FIG. 2 is a schematic plan view of a front surface of the passive knee bolster of FIG. 1.

Turning now to FIGS. 1 and 2, shown is a knee bolster assembly 10 comprising an injection molded body 20, a plurality of integral brackets 22, and a plurality of energy absorbing elements 24, each energy absorbing element 24 being operably associated with a respective integral bracket 22.

Figure 3:
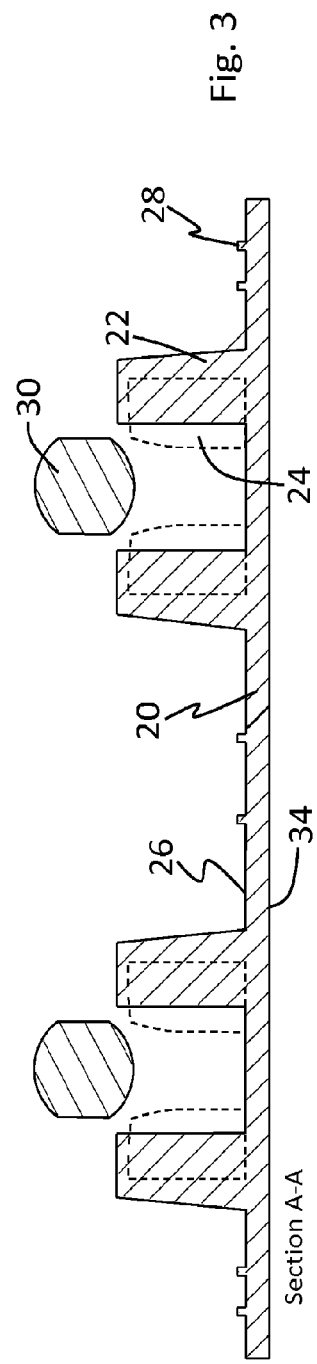
FIG. 3 is a cross-sectional view through section A-A identified in FIG. 2.

Body 20 is largely of solid-core construction, as generally achieved through an injection molding manufacturing process. A cross-section through slice A-A of FIG. 2 is presented in FIG. 3. Integrally formed during the injection molding operation are brackets 22, each of which serves to retain an energy absorbing element 24. Brackets 22 are provided as projections extending from a front surface 26 of body 20. Also provided on front surface 26 are one or more integrally formed stiffening ribs 28. In the embodiment shown, a plurality of stiffening ribs 28 in both a vertical and horizontal arrangement is provided on front surface 26.

Figure 4:
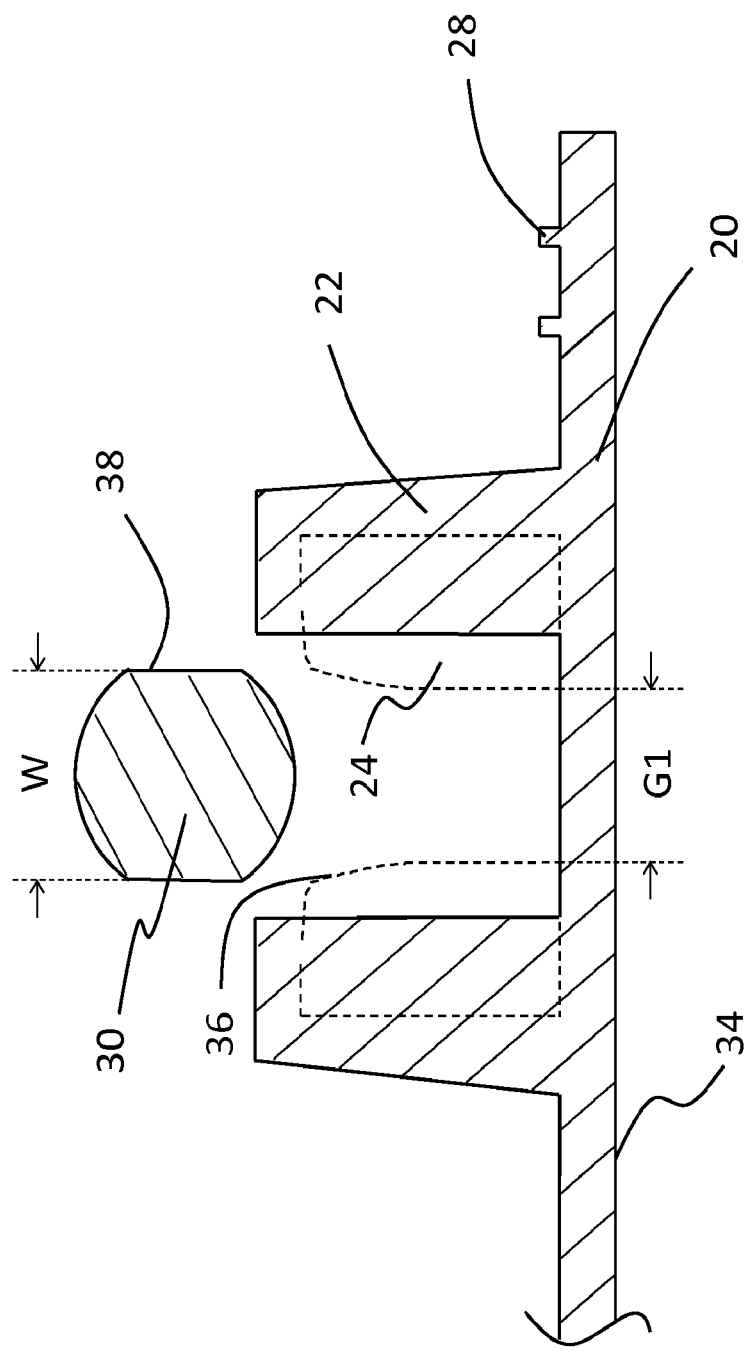
FIG. 4 is an enlargement of one pair of brackets as presented in the cross-sectional view of FIG. 3.
Figure 5:
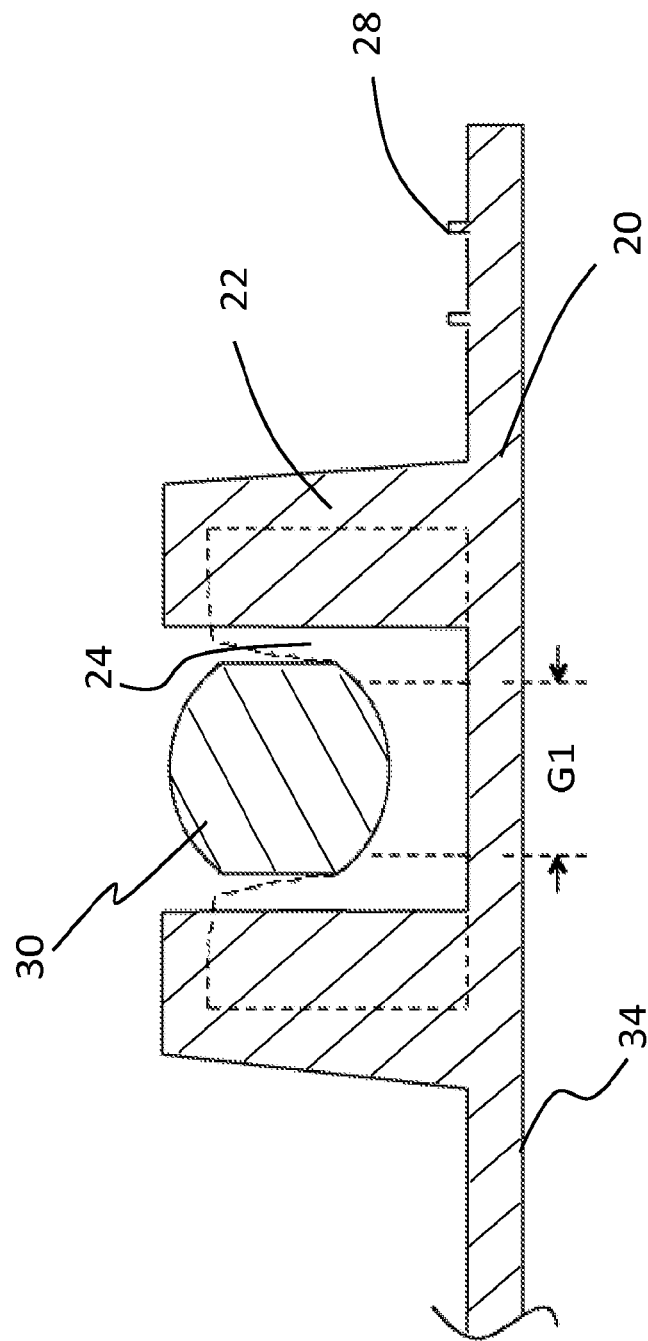
FIG. 5 is an enlargement of one pair of brackets similar to FIG. 4, showing partial engagement of the bracket pair with an extension beam.

Brackets 22 are provided in paired sets, with each pair operating cooperatively to provide an energy absorbing function on engagement with a vehicle frame structure, as would occur, for example during a crash event. Referring now to FIG. 4, each pair of brackets 22 is positioned proximate an extension beam 30 solidly connected to the vehicle frame, for example through instrument panel cross-car beam 32 (as seen in FIG. 1). The gap spacing G1 between adjacently disposed energy absorbing elements 24 in each paired set of brackets is less than the width W of extension beam 30 at this location. As such, when bolster assembly 10 is impacted from the rear surface 34, the assembly is driven forwardly causing each bracket pair to engage extension beam 30, as shown in FIG. 5. As gap spacing G1 is less than the width of extension beam 30, there is physical resistance to the forward motion of the assembly, resulting in energy absorption. In general, forward movement of the bracket pairs is accompanied by plastic deformation of energy absorbing elements 24.

Figure 6A:
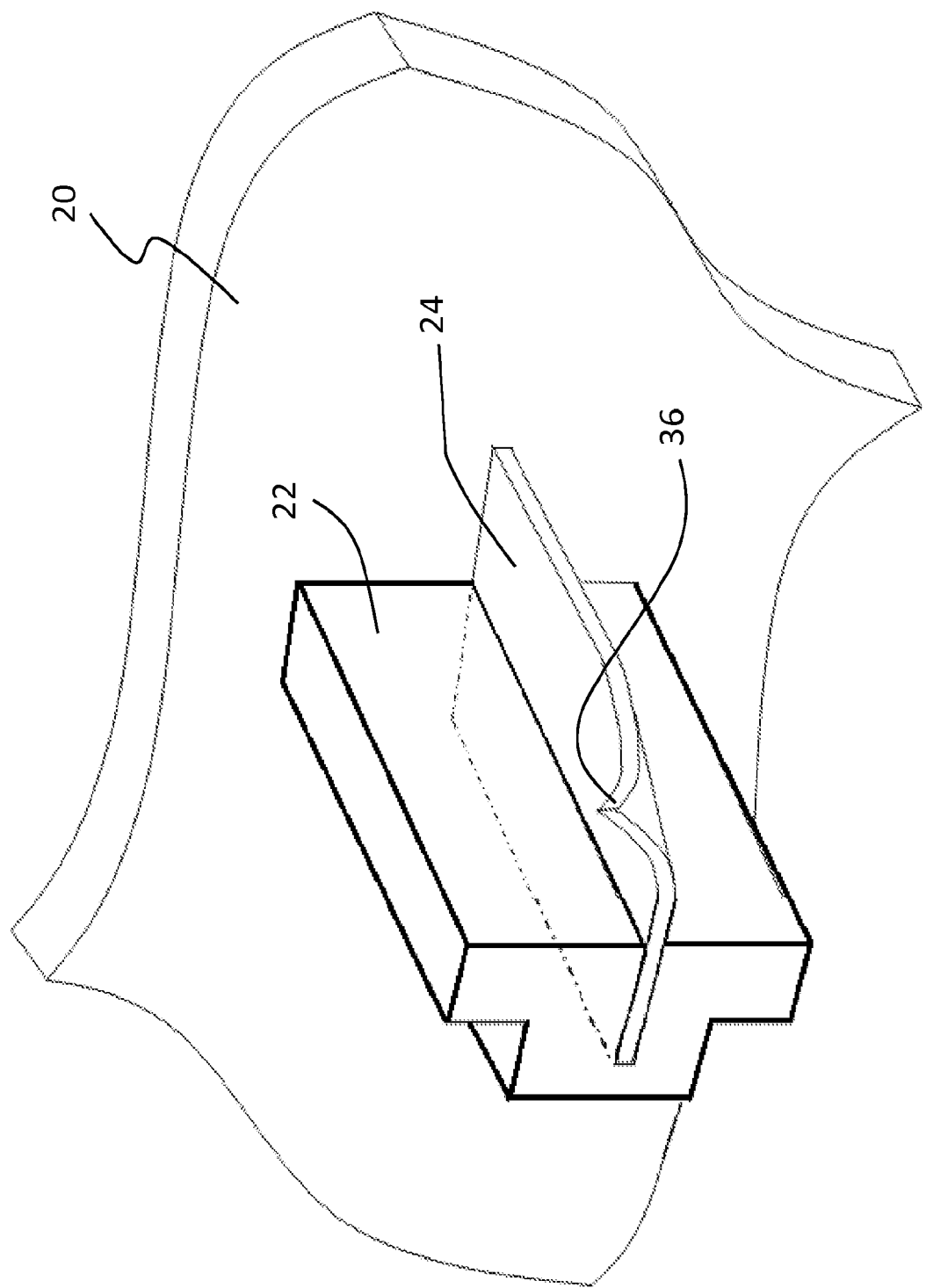
FIG. 6a is an enlarged perspective view of the passive knee bolster of FIG. 1, detailing a bracket and respective energy absorbing element.

To facilitate the deformation of energy absorbing element 24 during a crash event, the lead-in region 36 of each energy absorbing element 24 is provided with a contoured or deflected corner. For example, as shown in FIG. 6a, lead-in region 36 is angularly deflected, so as to establish a predetermined direction of deformation on engagement with extension beam 30, as shown for example in FIG. 6b. Note that for clarity, only one bracket 22 of the bracket pair is shown. In other embodiments, energy absorbing element 24 may be contoured with a chamfered or rounded lead-in region, or may be angularly deflected in the opposing direction (not shown) to that detailed above. Extension beam 30 may be configured with a circular cross-section. In the embodiment shown, extension beam 30 also comprises a flattened surface 38. Flattened surface 38 serves to guide the direction of bolster displacement by limiting movement of energy absorbing elements 24 therein. In general, the recess formed by flattened surface 38 has the effect of promoting forward (i.e. horizontal) displacement on impact, in general by reducing upwards or downwards deflection. As an alternative to the flattened surface, extension beam 30 may be provided with a groove or similar structure to guide energy absorbing elements on engagement. Gap spacing G1 relative to width W, the selection of material (e.g. metal type), and the structural dimensions of the energy absorbing elements all contribute to the energy absorption characteristics achieved.

To mount bolster assembly 10 on an instrument panel, bolster assembly 10 is provided with suitable fasteners. In the embodiment shown (see FIGS. 1 and 2), a plurality of clip towers 40 are integrally molded onto front surface 26 of body 20. Each clip tower 40 receives a respective fastening clip 42, the tower/clip arrangement cooperating with a mating aperture (not shown) on the instrument panel structure, thereby securing bolster assembly 10 thereto. Fastening clips 42 may be separately formed structures that are mounted on clip towers 40, or may be integrally formed with clip tower 40 during the injection molding process. In addition to clip towers 40, additional fixtures or surface features (e.g. alignment protrusions) may be provided to ensure accurate fit and finish.

While an additional surface treatment or component (e.g. skin) may be applied to rear surface 34 of body 20 to achieve a desired finished surface, in some embodiments, rear surface 34 is provided as a Class "A" surface. As used herein, a Class "A" surface is intended to refer to a surface that is visually decorative and smooth to the unaided eye or, in other words is visually free of unintentional distortions, such as sink marks, dimples, indents, divots, and the like. As is generally known in the art, unintentional distortions (e.g. sink marks) can arise on the outside surface of an article opposite a projection/rib.

While a range of techniques may be used to manufacture body 20 as detailed above, to achieve the desired Class "A" surface, one exemplary suitable technique is the injection molding process disclosed in U.S. Pat. No. 7,846,533, the contents of which are herein incorporated by reference. Although not discussed in detail herein, U.S. Pat. No. 7,846,533 teaches a process for injection molding plastic articles using a molten thermoplastic plastic, a blowing agent and a pressurize-able mold cavity. In the process, gas cells form within the molten plastic and through the control of venting of the pressurizing gas during the molding process, a finished molded plastic article can be achieved having a Class "A" skin surface and a foamed core, regardless of the positioning of projections on the inside surface of the molded plastic article. For example, with some thermoplastic materials and traditional injection molding, a sink mark will form in the surface of the article when the thickness of the projection is 40% or greater than the thickness of the structure. In contrast, with the process detailed in U.S. Pat. No. 7,846,533, the thickness of the projection may be up to and/or greater than 100% of the thickness of the structure. Accordingly, having regard to the cross-sectional profile in FIG. 7, a body 20 incorporating this technology exhibits the presence of gas cells 44 (e.g. foamed regions) through the structure.

Using the aforementioned injection molding technology, body 20 can be formed with integral brackets 22 and stiffening ribs 28 on front surface 26, while still achieving the desired Class "A" surface on rear surface 34. As such, by virtue of the integral stiffening ribs, and an overall thicker wall structure, the bolster assembly does not require the metal back plate used in many prior art designs. Similarly, as brackets 22 can also be integrally formed with body 20, there is no need to prepare and affix separately formed brackets. These design enhancements simplify overall construction, and further serve to reduce weight and cost of the assembly.

As will be appreciated, the physical geometry or form of bracket 22 is not intended to be fixed to the embodiment detailed above. The above configuration is merely exemplary, as a range of bracket configurations may be suitably implemented. FIGS. 8a, 8b, and 8c present a non-limiting sample of additional bracket configurations that may find application in the active bolster assembly.

Energy absorbing elements 24 are securely retained by brackets 22, and may be in-molded or inserted into position. To ensure secure retention, energy absorbing elements 24 may be provided with anchorage features, for example surface depressions and/or protrusions. In some embodiments where energy absorbing elements 24 are in-molded into position, energy absorbing elements 24 may comprise one or more through-holes that permit for a physical lock by virtue of a plastic bridge formed therein.

Figure 9:
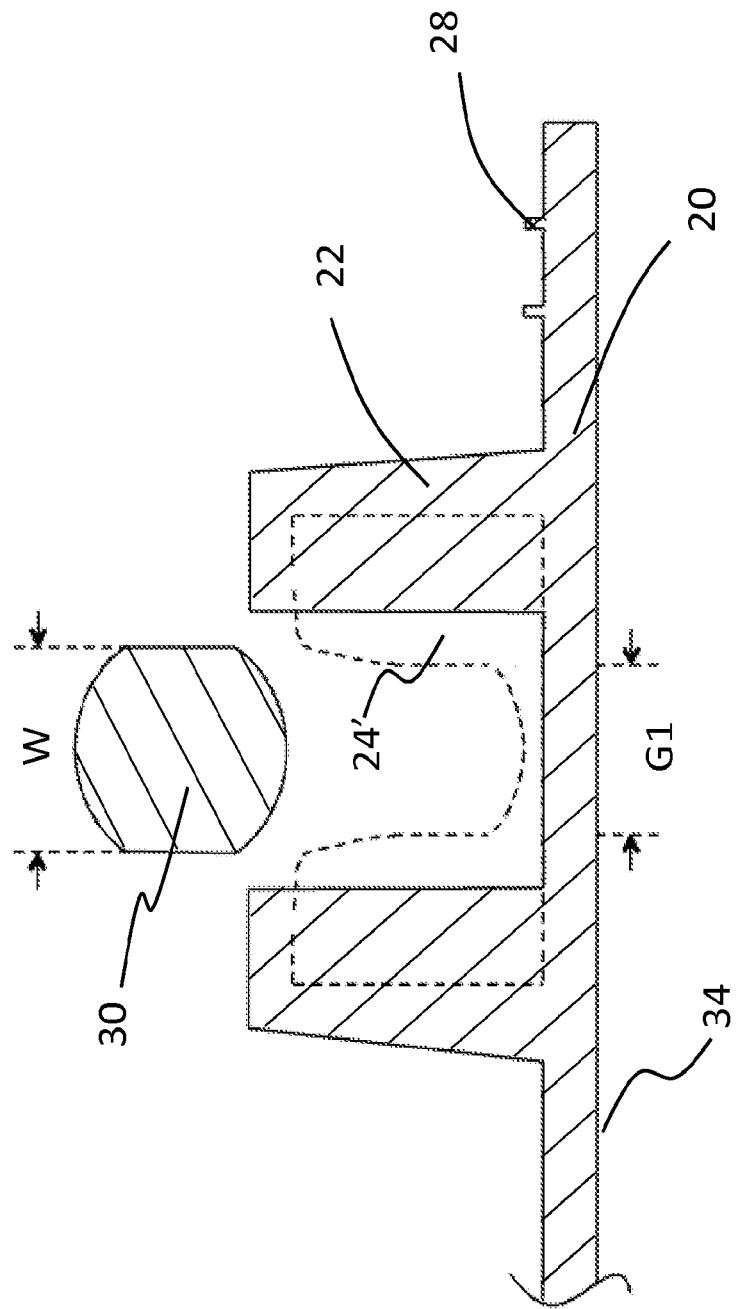
FIG. 9 is an enlargement of one pair of brackets, showing an alternate configuration for the energy absorbing element.

In each pairing of brackets 22, the embodiments detailed above have energy absorbing elements 24 provided as two separate structures, one per bracket. In other embodiments, a single energy absorbing element 24', generally U-shape in form may be implemented, as shown for example in FIG. 9.

While the embodiment detailed above used a separately formed metal component for energy absorbing element 24, in some embodiments, non-metallic elements may be implemented. For example, a fiber-reinforced polymeric material may be suitably used in some applications. In other embodiments, energy absorbing element 24 may be an integral component of bracket 22. For example, energy absorbing element 24 may be formed of the same material and concurrently with injection molded body 20 and integral brackets 22, thus defining a knee bolster assembly 10 of unitary construction.

It will be appreciated that while extension beam 30 has been exemplified above as having a circular cross-section (with flattened/planar sections), in other embodiments, extension beam 30 may be configured with other cross-sectional profiles. For example, in an alternate embodiment, extension beam 30 is provided with a square or rectangular cross-section. In addition, while extension beam 30 is represented as simply extending downwardly from cross-car beam 32, extension beam 30 may include additional support brackets or strengthening features to reduce possible deflection during impact.

As detailed above, brackets 22 are provided in pairs, with each pair operating cooperatively to provide an energy absorbing function on engagement with the vehicle frame structure. It will be appreciated that while bolster system 10 has been shown as having 4 bracket pairs, this is merely exemplary. In some embodiments, there may be more bracket pairs (e.g. 6 pairs) or fewer bracket pairs (e.g. 2 pairs) provided on the bolster.

Energy absorption during a crash must be a controlled event, so as to avoid subjecting the vehicle occupant to peak loads exceeding threshold values known to exceed injury limits. In addition, the energy absorption must be such that the extent of forward motion is limited, to prevent 'submarining' of the occupant under the instrument panel. At the same time, it may be necessary to direct loads to certain areas of the body, for example the leg region, to reduce damaging effects upon more critical areas of the body, such as the torso region. This can be particularly true with drivers, where the steering column can impart considerable bodily damage during a crash event.

Turning now to FIG. 10, shown is an exemplary load deflection profile for a conventional prior art passive bolster. Peak regions A and B represent separate peak loads. Peak load A generally arises from the initial impact and energy absorption upon the bolster, while peak load B arises from the bolster reaching maximum displacement ("bottoming-out"). Where these peak loads exceed a threshold value (e.g. 6000 N for $5^{th}$ percentile), injury to the occupant may occur.

The load deflection profile also demonstrates a common characteristic of prior art bolsters, namely the failure to maintain a constant resistance to forward displacement during use. With many passive bolster systems, the energy management devices used (e.g. mounting brackets) provide an initial resistance (corresponding to peak A), which thereafter deteriorates once the device buckles. Where sufficient energy remains to be dissipated, forward displacement of the bolster continues until the maximum allowable displacement is achieved (corresponding to peak B).

In contrast, passive bolster 10 achieves a more constant resistance to forward displacement, resulting in a load deflection curve having characteristics closer to curve C shown in FIG. 11. During use, from initial engagement and deformation of energy absorbing element 24 on extension beam 30, through the complete allowable displacement along bracket 22, the resistance to forward displacement is approximately constant, resulting in a more rectangular load deflection profile. Advantageously, the rectangular load deflection profile reduces the peak loads, and for a given amount of energy requiring dissipation, results in a shorter overall displacement. As such, upon impact of the occupant's knees upon passive bolster 10, a more controlled energy dissipation ensues, with reduced peak loads, increased consistency in forward resistance and reduced forward displacement.

As the forward resistance and hence the load deflection characteristics are dependent upon the choice of material and strength characteristics of energy absorbing elements 24, the overall performance characteristics of the passive bolster can be easily modified. For example, in some installations where a lower overall load is preferred, a more pliable material may be implemented for the energy absorbing element. In other installations, where a higher overall load is preferred, a stiffer material may be implemented. It will be appreciated that gap spacing G1 between paired energy absorbing elements 24 need not be fixed. In some embodiments, gap spacing G1 may be variable to define a stepped load-deflection profile, with for example first and second desired resistance characteristics to forward displacement. In other words, gap spacing G1 serves as a tuning parameter to achieve a desired performance of bolster assembly 10.

While any thermoplastic which is capable of being injection molded may be used, the selected thermoplastic should have the appropriate behaviour and quality to achieve the desired aesthetic and performance characteristics. Exemplary suitable materials include (but are not limited to): polyolefins (examples including: polypropylene (PP), polyethylene (PE), polymethylpentene (PMP), polybutene-1 (PB-1)), polyolefin elastomers (examples including: polyisobutylene (PIB), ethylene propylene rubber (EPR), ethylene propylene diene monomer (M-class) rubber (EPDM rubber)), thermoplastic elastomers (TPE; examples including: polyolefin blends, thermoplastic elastic olefin (TEO), thermoplastic polyolefin (TPO), thermoplastic vulcanizates (TPV), thermoplastic polyurethanes, thermoplastic copolyester, thermoplastic polyamides), acrylonitrate-butadiene-styrene (ABS), polycarbonate (PC), polybutadiene terephthalate (PBT), polyethylene terephthalate (PET), polyvinyl chloride (PVC), polystyrene (PS), polylactic acid (PLA), polyamide (PA), thermoplastic elastomer polyester-ether (TEEE), polyoxymethylene (POM), natural & synthetic rubbers, and blends of the above materials with and/or without other suitable materials (e.g. fillers including, but not limited to glass fibres, talc, etc.).

It is important to note that the construction and arrangement of the features in the various exemplary embodiments is illustrative only. Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications changes and omissions may also be made in design, operating conditions and arrangement of the various exemplary embodiments without departing from the present scope of the invention. It will also be understood that each feature of each embodiment discussed herein, and of each reference cited herein, can be used in combination with the features of any other combination. All patents and publications discussed herein are incorporated by reference herein in their entirety.

What is claimed is:

1. A bolster assembly for a vehicle comprising:
a body;
a plurality of brackets provided on a front surface of said body, said brackets being arranged in paired sets; and
a plurality of energy absorbing elements, wherein each energy absorbing element is operably associated with a respective bracket, and where within each paired set of brackets, said energy absorbing elements are disposed in adjacent relationship separated by a gap,
wherein said paired sets of brackets are aligned with a frame structure provided in said vehicle, said frame structure having a width greater than said gap, and
wherein upon a crash event and forward displacement of said body, said paired sets of brackets engage said frame structure, said energy absorbing elements deforming during said forward displacement to absorb energy.

2. The bolster assembly of claim 1, wherein said body is injection molded, and said brackets are integrally formed with said body.

3. The bolster assembly of claim 2, wherein said body and said brackets are provided with incorporated gas cells in the injection molded structure, thereby defining a foamed core.

4. The bolster assembly of claim 1, wherein said body further comprises one or more integrally formed stiffening ribs.

5. The bolster assembly of claim 1, wherein said energy absorbing elements are provided with a lead-in region that is angularly deflected, serving to establish a pre-determined direction of deformation on engagement with said frame structure.

6. The bolster assembly of claim 1, wherein said front surface of said body additionally comprises suitable fasteners for mounting said bolster assembly to an instrument panel.

7. The bolster assembly of claim 6, wherein said fastener generally comprises a fastening clip mounted on a clip tower, the clip/tower arrangement cooperating with a mating aperture on said instrument panel.

8. The bolster assembly of claim 1, wherein said energy absorbing element is a separately formed component, and is in-molded during production, or inserted post-production into said bracket.

9. The bolster assembly of claim 1, wherein said energy absorbing element is provided with anchorage features to ensure retention of said energy absorbing element in said bracket.

10. The bolster assembly of claim 1, wherein two opposing energy absorbing elements provided in a paired set of brackets is provided generally in U-shaped form.

11. A bolster system for a vehicle comprising:
a frame structure provided on said vehicle, said frame structure comprising a cross-bar beam and one or more extension beams extending therefrom; and
a bolster assembly for mounting to said vehicle, said bolster assembly comprising a body;
a plurality of brackets provided on a front surface of said body, said brackets being arranged in paired sets; and
a plurality of energy absorbing elements, wherein each energy absorbing element is operably associated with a respective bracket, and where within each paired set of brackets, said energy absorbing elements are disposed in adjacent relationship separated by a gap,
wherein said paired sets of brackets are aligned with a respective extension beam, said extension beam having a width greater than said gap, and
wherein upon a crash event and forward displacement of said body, said paired sets of brackets engage said extension beam, said energy absorbing elements deforming during said forward displacement to absorb energy.

* * * * *